United States Patent
Yabusaki (10) Patent No.: US 12,432,091 B2
(45) Date of Patent: Sep. 30, 2025

(54) FAILOVER MECHANISM FOR IOT GATEWAY

(71) Applicant: HITACHI VANTARA LLC, Santa Clara, CA (US)

(72) Inventor: Hitoshi Yabusaki, Walnut Creek, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 362 days.

(21) Appl. No.: 18/033,001

(22) PCT Filed: Oct. 30, 2020

(86) PCT No.: PCT/US2020/058345
§ 371 (c)(1),
(2) Date: Apr. 20, 2023

(87) PCT Pub. No.: WO2022/093275
PCT Pub. Date: May 5, 2022

(65) Prior Publication Data
US 2023/0308310 A1   Sep. 28, 2023

(51) Int. Cl.
*H04L 12/46*          (2006.01)
*H04L 41/0654*        (2022.01)
(Continued)

(52) U.S. Cl.
CPC .......... *H04L 12/46* (2013.01); *H04L 41/0654* (2013.01); *H04L 45/28* (2013.01);
(Continued)

(58) Field of Classification Search
None
See application file for complete search history.

(56) References Cited

U.S. PATENT DOCUMENTS

| | | |
|---|---|---|
| 8,725,693 B2 | 5/2014 | Lee et al. |
| 9,276,806 B2 | 3/2016 | Cartmell et al. |

(Continued)

FOREIGN PATENT DOCUMENTS

| | | |
|---|---|---|
| EP | 1776825 B1 | 12/2012 |
| WO | 2018209189 A1 | 11/2018 |

OTHER PUBLICATIONS

Venkataraman et al., "Energy-efficient cluster-based scheme for failure management in sensor networks", The Institution of Engineering and Technology, Feb. 2, 2008, retrieved on [Jan. 5, 2021]. Retrieved from the internet , URL: https://www.search.proquest.com/docview/1622264510?fromopenview=true&pq-origsite=gscholar> entire document.

(Continued)

*Primary Examiner* — Angela Nguyen
(74) *Attorney, Agent, or Firm* — PROCOPIO, CORY, HARGREAVES & SAVITCH LLP (57) ABSTRACT

Aspects of the present disclosure involve systems and methods that involve providing a health status from each of a plurality of gateways, the plurality of gateways comprising an active gateway and one or more inactive gateways, the plurality of gateways receiving sensor data, wherein the active gateway transmits the received sensor data to a server; for a detection of a failure of the active gateway based on the health status, selecting an inactive gateway from the one or more inactive gateways to take over transmission of the active gateway; changing a status of the active gateway to inactive; identifying the sensor data received from the active gateway before the failure; and controlling the selected inactive gateway to discard the identified sensor data and resume transmission of the sensor data to the server.

14 Claims, 9 Drawing Sheets

(51) Int. Cl.
     *H04L 45/28*     (2022.01)
     *H04L 47/32*     (2022.01)
     *H04L 49/552*     (2022.01)
     *H04W 88/16*     (2009.01)

(52) U.S. Cl.
     CPC ............ *H04L 47/32* (2013.01); *H04L 49/552* (2013.01); *H04W 88/16* (2013.01)

(56) References Cited

U.S. PATENT DOCUMENTS

| | | |
|---|---|---|
| 2009/0245098 A1 | 10/2009 | Baker et al. |
| 2009/0279516 A1 | 11/2009 | Kok et al. |
| 2011/0007787 A1* | 1/2011 | Suga .................... G01S 5/0027 |
| | | 375/222 |
| 2013/0088956 A1* | 4/2013 | Zhou .................... H04W 28/02 |
| | | 370/230 |
| 2015/0063360 A1 | 3/2015 | Thakkar |
| 2018/0159930 A1 | 6/2018 | Watts et al. |
| 2023/0025059 A1* | 1/2023 | Bohra ................ G06F 11/1464 |

OTHER PUBLICATIONS

International Search Report and Written Opinion date Feb. 2, 2021, in International Application No. PCT/2020/058345.
Extended European Search Report issued in corresponding Patent Application EP20960177.2, dated Jul. 2, 2024, 13 pages.

* cited by examiner

FAILOVER MECHANISM FOR IOT GATEWAY

BACKGROUND

Field

The present application is generally directed to gateways, and more specifically, to facilitating failover mechanisms for gateways.

Related Art

There are several failover mechanisms for gateways, however most of them focuses on network. For example, there are related art implementations in which the network connectivity from master to slave is solved. Data loss or duplication is not addressed in such example implementations.

In another related art implementation directed to data loss or duplication, there is a database system in which the failover in database is achieved by sending a health check probe between clustered databases. For example, a backup database directly sends health check probe to active database, and the backup database is promoted to active if the probe fails certain times, thus clustered entities can quickly failover with small downtime.

SUMMARY

The gateway is located in the field network without firewall, unlike a database in the datacenter. If such failover technology is applied gateways, there are several issues that can occur.

One issue is security. The gateway should not expose Transmission Control Protocol/User Datagram Protocol (TCP/UDP) ports for a health check probe in the field network, otherwise, the gateway faces security vulnerability risks. However, if the gateway does not expose the TCP/UDP port for a health check probe, then there needs to be a way for the backup (inactive) gateway to be aware of when the active gateway becomes unhealthy.

Another issue is network cost. Some gateways are connected to the appliance server via a cellular network, and inactive gateways can be notified of the health of the active gateway. However, frequent health check notifications incurs higher network costs.

Another issue is data loss. If gateways do not send health check very frequently, it takes more time to detect failure. The longer it takes to detect the active gateway status, the more data can be lost. There is a need to minimize the data loss and data duplication.

To address the above issues, the example implementations described herein involve a failover mechanism for a gateway cluster. The gateway cluster involves an active and an inactive gateway. Both gateways receive the same sensor data and only active gateway sends sensor data to appliance server/cloud. Unlike the switch over mechanism of databases (which send health check probe with each other), failover is done via an agent manager in an appliance server/cloud without sending health check probes with each other.

Aspects of the present disclosure can involve a method, which can involve providing a health status from each of a plurality of gateways, the plurality of gateways including an active gateway and one or more inactive gateways, the plurality of gateways receiving sensor data, wherein the active gateway transmits the received sensor data to a server, and for a detection of a failure of the active gateway based on the health status, selecting an inactive gateway from the one or more inactive gateways to take over transmission of the active gateway; changing a status of the active gateway to inactive; identifying the sensor data received from the active gateway before the failure; and controlling the selected inactive gateway to discard the identified sensor data and resume transmission of the sensor data to the server.

Aspects of the present disclosure can involve a computer program, which can involve instructions including providing a health status from each of a plurality of gateways, the plurality of gateways including an active gateway and one or more inactive gateways, the plurality of gateways receiving sensor data, wherein the active gateway transmits the received sensor data to a server, and for a detection of a failure of the active gateway based on the health status, selecting an inactive gateway from the one or more inactive gateways to take over transmission of the active gateway; changing a status of the active gateway to inactive; identifying the sensor data received from the active gateway before the failure; and controlling the selected inactive gateway to discard the identified sensor data and resume transmission of the sensor data to the server. The computer program can be stored on an on-transitory computer readable medium and executed by one or more processors.

Aspects of the present disclosure can involve a system, which can involve means for providing a health status from each of a plurality of gateways, the plurality of gateways comprising an active gateway and one or more inactive gateways, the plurality of gateways receiving sensor data, wherein the active gateway transmits the received sensor data to a server, and for a detection of a failure of the active gateway based on the health status, means for selecting an inactive gateway from the one or more inactive gateways to take over transmission of the active gateway; means for changing a status of the active gateway to inactive; identifying the sensor data received from the active gateway before the failure; and means for controlling the selected inactive gateway to discard the identified sensor data and resume transmission of the sensor data to the server.

Aspects of the present disclosure can include an apparatus such as a gateway, which can involve a memory configured to store received sensor data; and a processor, configured to provide a health status to a server over a network; for the apparatus having a status of active, transmit the stored received sensor data to the server; and for the apparatus having the status of inactive, manage the received sensor data in memory; for receipt of a status change to change the status to active, change the status of the apparatus to active; discard, from the memory, the received sensor data already transmitted to the server; and transmit the stored received sensor data to the server.

Aspects of the present disclosure can involve a system having a plurality of gateways which can each provide a health status to a server, the plurality of gateways including an active gateway and one or more inactive gateways, the plurality of gateways receiving sensor data over a network from one or more sensors, wherein the active gateway transmits the received sensor data to a server, and for a detection of a failure of the active gateway based on the health status by the server, the server is configured to select an inactive gateway from the one or more inactive gateways to take over transmission of the active gateway; change a status of the active gateway to inactive; identify the sensor data received from the active gateway before the failure; and control the selected inactive gateway to discard the identified sensor data and resume transmission of the sensor data to the server.

Aspects of the present disclosure can involve a computer program, storing instructions for execution by a gateway, the instructions including storing received sensor data in memory; providing a health status to a server over a network; for the gateway having a status of active, transmitting the stored received sensor data to the server; and for the gateway having the status of inactive, managing the received sensor data in memory; and for receipt of a status change to change the status to active, changing the status of the gateway to active; discarding, from the memory, the received sensor data already transmitted to the server; and transmitting the stored received sensor data to the server. The computer program can be stored on a non-transitory computer readable medium and executed by one or more processors of the gateway.

Aspects of the present disclosure can involve a method for a gateway, the method including storing received sensor data in memory; providing a health status to a server over a network; for the gateway having a status of active, transmitting the stored received sensor data to the server; and for the gateway having the status of inactive, managing the received sensor data in memory; and for receipt of a status change to change the status to active, changing the status of the gateway to active; discarding, from the memory, the received sensor data already transmitted to the server; and transmitting the stored received sensor data to the server.

Aspects of the present disclosure can involve a gateway including means for storing received sensor data in memory; means for providing a health status to a server over a network; for the gateway having a status of active, means for transmitting the stored received sensor data to the server; and for the gateway having the status of inactive, means for managing the received sensor data in memory; and for receipt of a status change to change the status to active, means for changing the status of the gateway to active; means for discarding, from the memory, the received sensor data already transmitted to the server; and means for transmitting the stored received sensor data to the server.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In example implementations, there are multiple gateways that are connected to an external sensor (Modbus, motion sensor, etc.), wherein only one of the gateways is active and passing the data to the appliance. This avoids the duplication of data and overloading connections to the cloud, but still gives gateways a failover-hot replace mode. All gateways receive the data, but only the active gateway forwards the data. Inactive gateways store data for a certain period of time, then discards the older data. Through such example implementations, a small buffer of the latest data can thereby be retained for avoiding data loss. Because the gateways are clustered, they all receive the same configuration and containers. The only difference between the gateway configuration is that the one gateway that the agent manager determines is active and maintains synchronization on it with a status of active for sending data.

If the active gateway becomes unhealthy, the appliance "starts" another by sending a command to one of the other gateways to become active and handle transmission of the data. The inactive gateway detects what data is not sent by the previously active gateway and sends only data that was not sent by the active gateway.

In the system architecture, the system includes an application system on the cloud/appliance server, a gateway in the field network, and external sensors. The gateway is connected to an application system on the cloud via cellular, Wi-Fi, and so on. Examples of sensors are Modbus, motion sensor, and so on.

The gateway can include a data receiver that receives data from external sensors, a data storage that temporally stores sensor data, a data sender that sends data to the cloud/appliance server, an agent that monitors gateway status and updates the active/inactive mode of the gateway, and the data duplication detector that detects data that already sent to the cloud by the other gateway (which may be included in data sender). The mode of the gateway can be set to active gateway and inactive gateway. Further, all the services in both gateways are running.

The cloud/appliance server can include a data receiver service that receives sensor data sent from gateways, a data storage (e.g. database, NoSQL, blob-store) that stores received data, and an agent manager that manages the agent.

Gateway failures can be classified as either a silent failure or a non-silent failure. In an example of a silent failure, the agent in gateway does not send an unhealthy probe to an agent manager in the cloud. Examples of a silent failure can include a gateway shutting down while not connected to cloud, a gateway power that becomes unplugged, a network going down, and so on. A non-silent failure involves an agent in the gateway sending failure information to the manager in the cloud. Example of non-silent failures can involve a gateway gracefully shutting down while connected to cloud, the management plane (agent and agent manager) indicating a healthy status, with a data plane having issues, the data sender in gateway having an issue, and a data receiver in the cloud/appliance having an issue.

Figure 1:
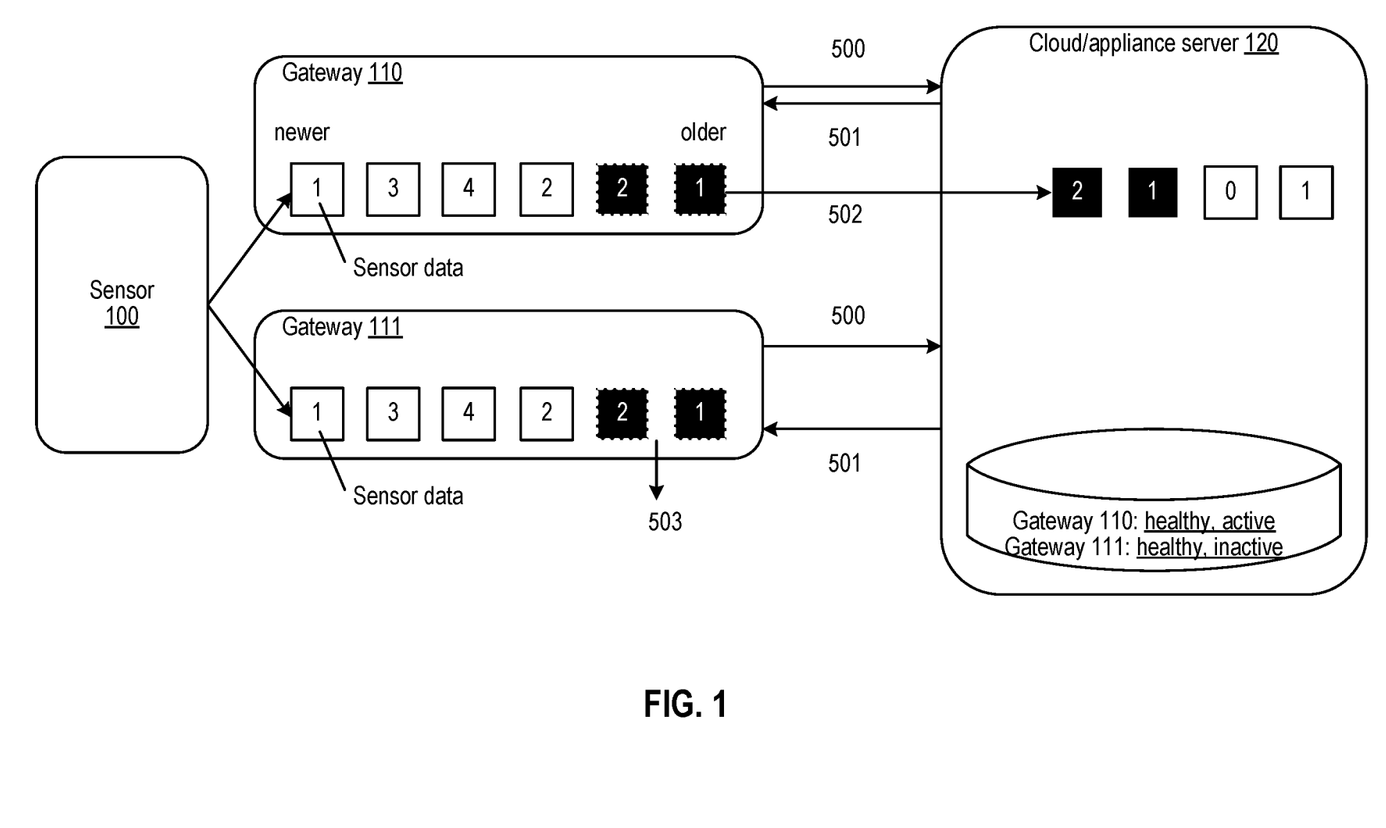
FIG. 1 illustrates an example scenario of the system before the occurrence of a failure, in accordance with an example implementation.

FIG. 1 illustrates an example scenario of the system before the occurrence of a failure, in accordance with an example implementation. Specifically, FIG. 1 illustrates the system before the occurrence of a silent failure. In this scenario, it is assumed that gateway 110 is active and fails, and gateway 111 is inactive and changes to active.

Before the occurrence of the silent failure, on the management plane, all of the gateways periodically send a health check probe to the agent manager. Further, all the gateways check their active-inactive state managed by the agent manager.

On the data plane, both the active 110 and inactive 111 gateways receive data from the sensor 100. The active gateway 110 sends sensor data to appliance server/cloud 129. The inactive gateway 111 saves sensor data locally until either it receives a notification from cloud/appliance server 120 that the data is received from gateway 111, or that the gateway disk space falls below a predefined threshold, which is conducted to keep gateway 111 healthy. Further details for the flow of FIG. 1 is provided in FIG. 5(a).

Figure 2:
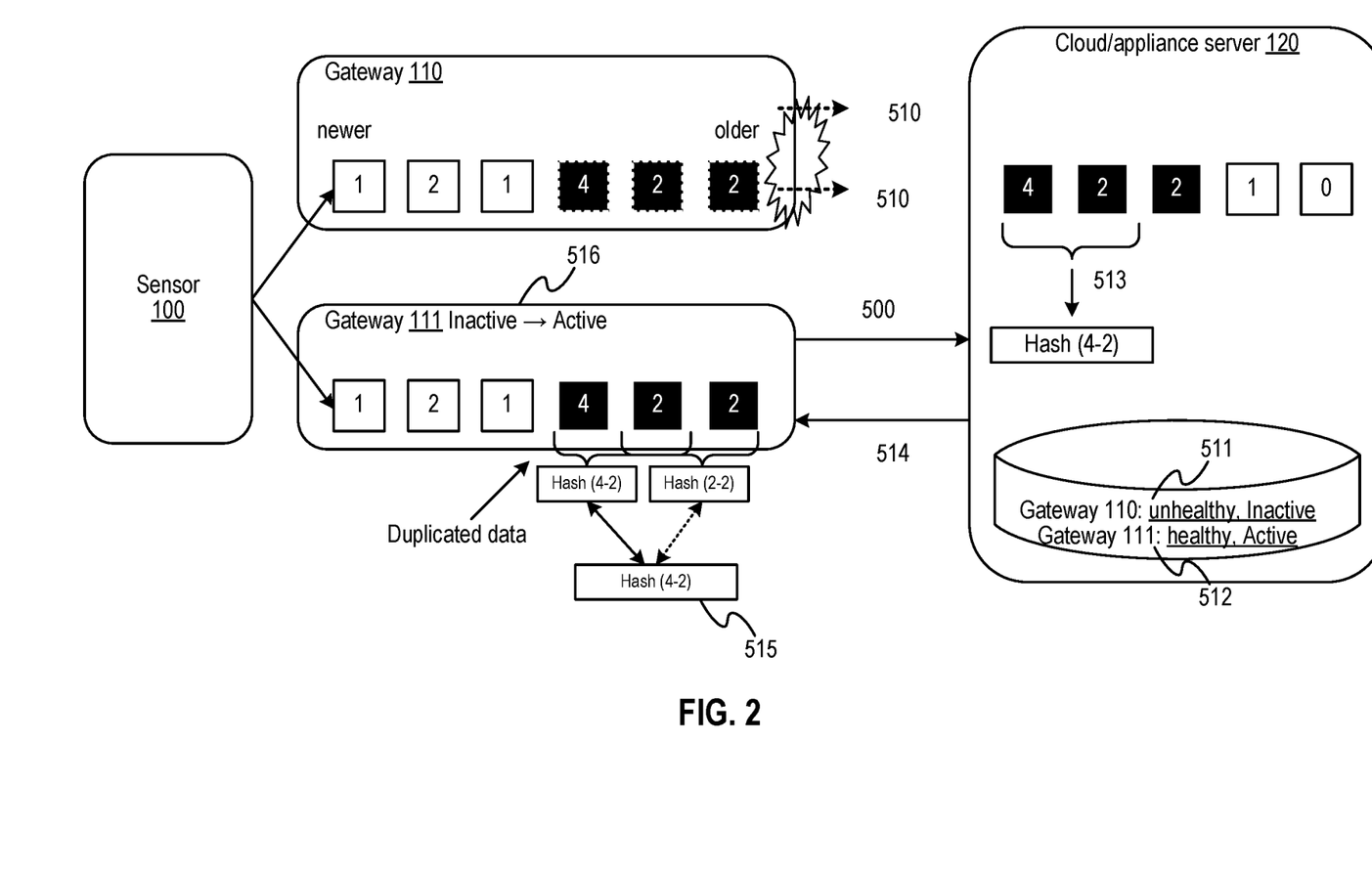
FIG. 2 illustrates an example scenario of the system during the occurrence of a silent failure, in accordance with an example implementation.

FIG. 2 illustrates an example scenario of the system during the occurrence of a silent failure, in accordance with an example implementation. When failure happens, the cloud/appliance server 120 does not receive sensor data on the data plane. On the management plane, the agent manger does not receive a health check probe from the agent. The agent manager changes the status of the gateway 110 to unhealthy and sets its mode to inactive. The agent manager promotes the gateway 111 to active. The agent manager identifies the last received sensor data and notifies the data to the inactive agent.

To identify the last received sensor data, note that time-series sensor data is not always unique (e.g., the same data may be received), because some sensor data may not include a corresponding universally unique identifier (UUID) or timestamp. The gateway may attach a timestamp to the sensor data before sending it to cloud/appliance server 120; but the timestamp attached by gateway 110 is not synchronized with gateway 111 in milliseconds because of network delay, even if both gateways are synced with a network time protocol (NTP) server. Thus, there is a need to process the data to determine what is the data that was previously sent.

The agent of gateway 111 is notified that its mode is active, and receives the last sensor data cloud/appliance that was received by the cloud/appliance server 120. In response, the agent of gateway 111 changes the status to active. In this case, the agent manager cannot notify gateway 110 that it is changed to inactive and that gateway 111 is changed to active. So, there is no way for gateway 110 to know from which data gateway 111 started transmission. On the data plane, the data sender service of gateway 111 discards the older data and sends all the data received from the sensor.

The data receiver in cloud/appliance server 120 calculates a hash value using a preset value (referred to as a window size) of consecutive time-series data. The window size must be long enough to make the hash unique. The adequate window size depends on the sensor data. If the sensor data rarely has the same value (e.g. picture image), the window size can be set to 1. The window size can be configured by a user or can be calculated by data receiver. For example, window size can be calculated by "{the number of hash collision in the past 10000 hash value calculated by window size X}<=1".

Data sender calculates the hashes with the same window size by sliding the window. It searches the window whose hash is the same with that sent from cloud/appliance server 120. The data older than the matched window (including data in the window) are already sent by gateway 110. Further details of the flow are provided with respect to FIG. 5(b).

Figure 3:
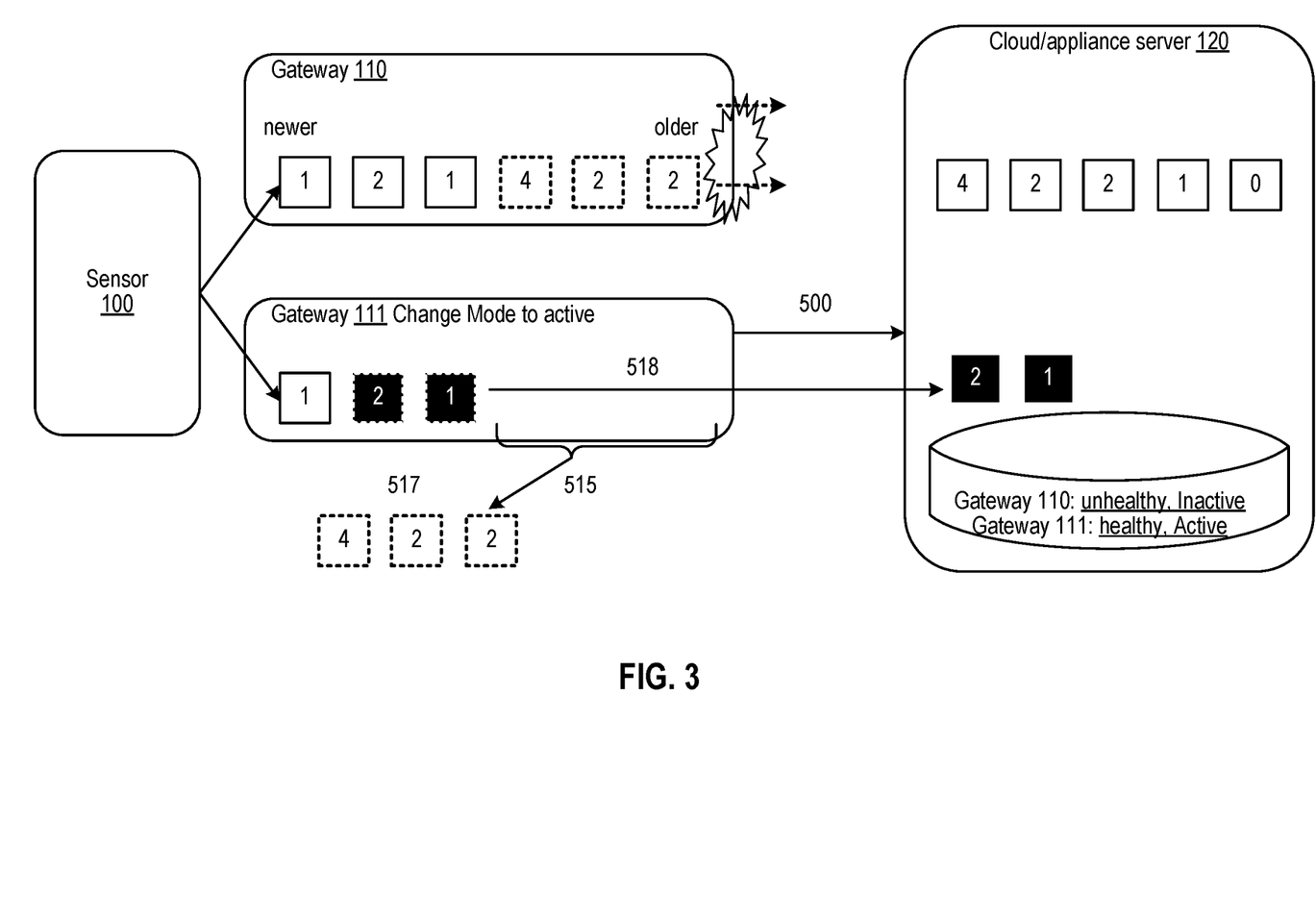
FIG. 3 illustrates an example of addressing packet disordering of the system during the occurrence of a failure, in accordance with an example implementation.

FIG. 3 illustrates an example of addressing packet disordering of the system during the occurrence of a failure, in accordance with an example implementation. The logic of detecting the last received sensor data relies on the sensors providing sequential sensor data. Cloud/appliance server 120 and gateways 110, 111 are connected via wide area network (WAN) or cellular network; and in some configurations of those networks, there are no guarantees that sensor data have arrived in First In First Out (FIFO) order. (i.e. sensor data is sent A→B→C, but may be received B→A→C) To avoid the disordering issue, the gateways 110, 111 attaches sequential numbers to the message of the sensor data when transmitted, so that a hash value can be calculated to sort the message according to the window. Further details of the flow are provided with respect to FIG. 5(b).

Figure 4:
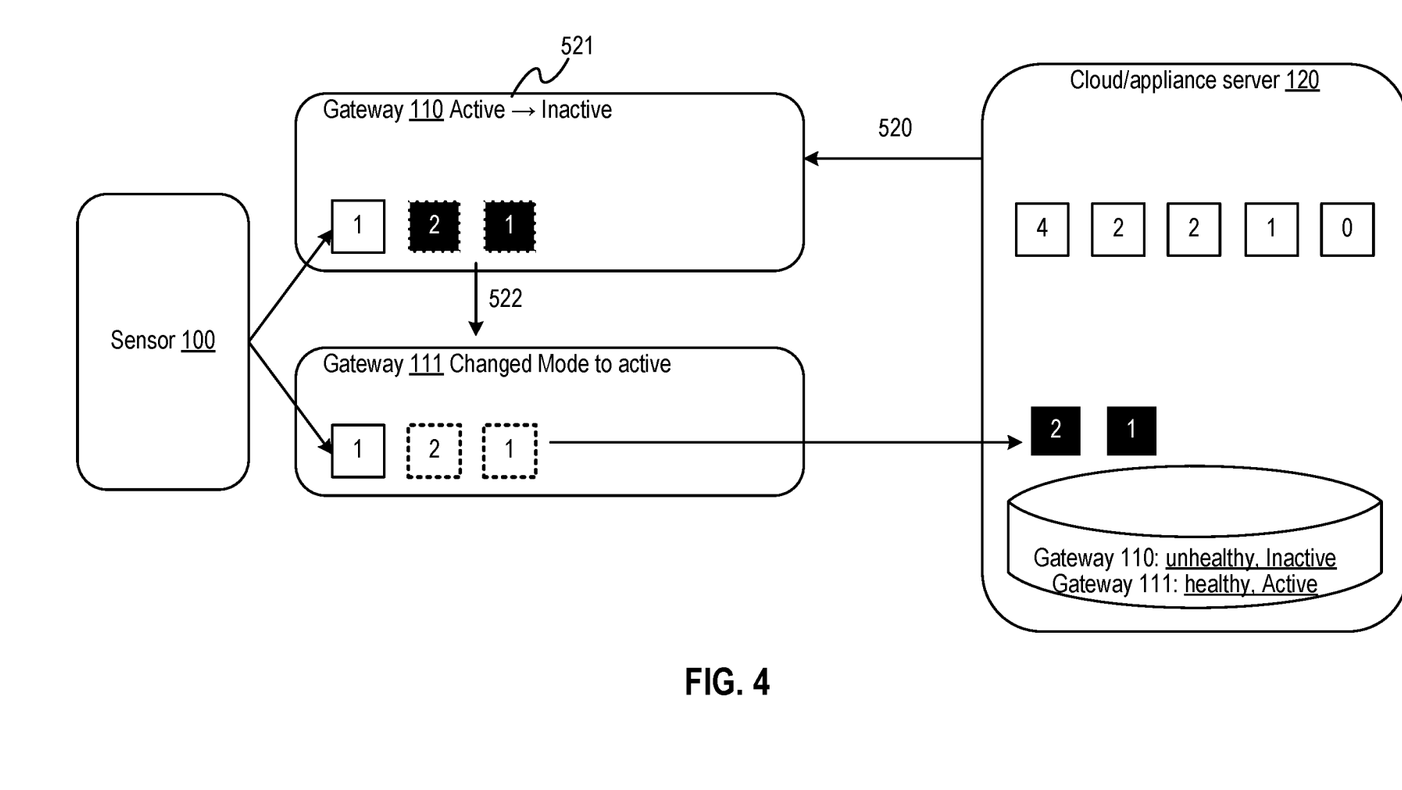
FIG. 4 illustrates a scenario involving the recovery of the active gateway, in accordance with an example implementation.

FIG. 4 illustrates a scenario involving the recovery of the active gateway, in accordance with an example implementation. If gateway 110 does not recover and needs to be replaced, then the sequence ends here. All of the data in gateway 110 has already been sent by gateway 111, so the data in gateway 110 is discarded. However, if gateway 110 recovers and becomes healthy again, then on the management plane, the agent of gateway 110 is notified that its mode is inactive. The now inactive gateway 110 saves sensor data locally for a certain period and discards older data. On the data plane, the data receiver service in cloud/appliance 120 and discards data from gateway 110.

In an example scenario involving a non-silent failure, when a failure occurs, on the data plane, the cloud/appliance server 120 stops receiving sensor data. On the management plane, the agent of gateway 110 sends unhealthy probe to the agent manage. The agent manager changes the status of the gateway 110 to unhealthy and its mode to inactive. The agent manager promotes the gateway 111 to active. The agent of gateway 110 is notified that its mode is inactive and acting as inactive mode (i.e. The sender service stops sending data, start storing data and discarding older data.) The agent manager identifies the last received sensor data and notifies it to the inactive agent. The agent of gateway 111 notified that its mode is active, and the last sensor data cloud/appliance received. The agent of gateway 111 changes the status to active.

On the data plane, the data sender service in gateway 111 sends all the local data to cloud/appliance server 120. Data sender service in gateway 11l sends all the data received from the sensor.

In this instance, if gateway 110 does not recover and needs to be replaced, then the sequence ends here. All the data in gateway 110 has already been sent by gateway 111, so the data in gateway 110 will be discarded. However, if the gateway 110 recovers and is running again, then on the data plane, then the data sender service in gateway 110 does not send data because it is in inactive mode.

This gateway failover mechanism can be applied to computing system in various Internet of Things (IoT) industries. Example of the industries are mobility (e.g. railway, airplane, ship, and connected car), smart factory, building management (e.g. elevator and escalator), power plant, oil and gas, water management, mining, space station, and any other machine or device that generate data. Gateway can be a hardware device such as an IoT gateway and smartphone or a virtual device such as a virtual machine and container. Further details of the flow are provided with respect to FIG. 5(c).

Figure 5A:
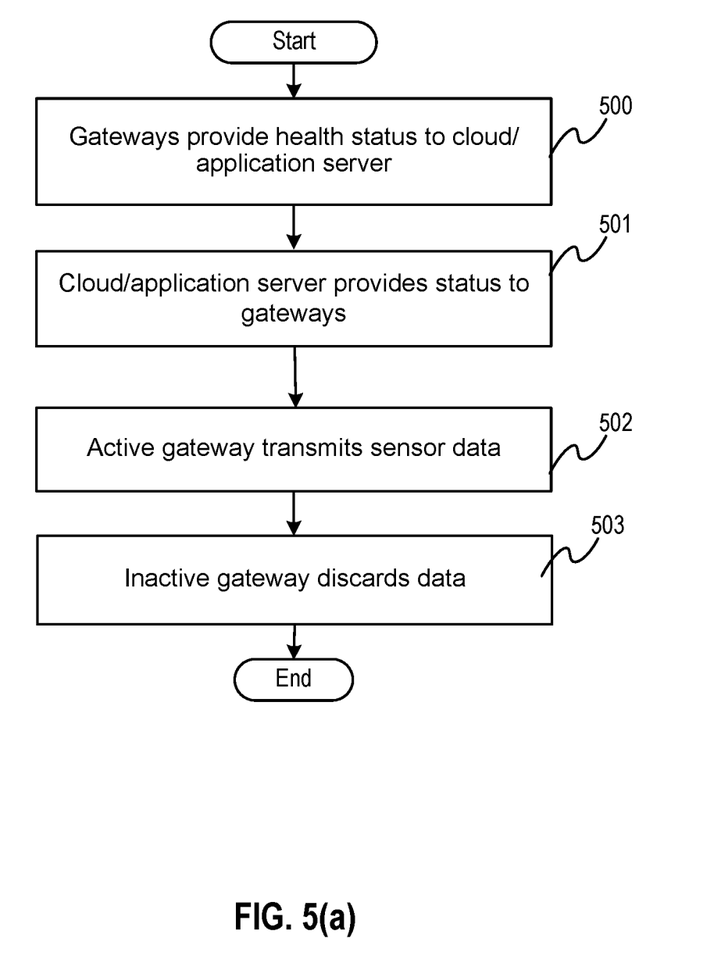
FIG. 5(a) illustrates an example flow for the system before failure, in accordance with an example implementation.

FIG. 5(a) illustrates an example flow for the system before failure, in accordance with an example implementation, as illustrated in FIG. 1. At 500, the active gateway 110 and the inactive gateway(s) 111 provide their health status to the cloud/application server 120. As the situation is before the failure occurrence, the active gateway 110 and inactive gateway(s) 111 send the health status of healthy to the cloud/application server 120. At 501, the cloud/application server 120 provides the inactive/active status to the active gateway 110 and inactive gateway(s) 111. In this scenario, the active gateway 110 is instructed that its status is active, and the inactive gateway(s) 111 is instructed that the status is inactive. At 502, the active gateway 110 transmits sensor data received from the sensors as buffered in the memory. At 503, the inactive gateway(s) 111 discards data in the memory according to the policy in the inactive gateway(s) 111. Such policies can include discarding data as instructed by active gateway 110 or cloud/application server 120, after a certain preset period time has elapsed as set in accordance with the desired implementation, after the sensor data in the memory has reached a certain threshold in accordance with the desired implementation, or in accordance with any other desired implementation.

Figure 5B:
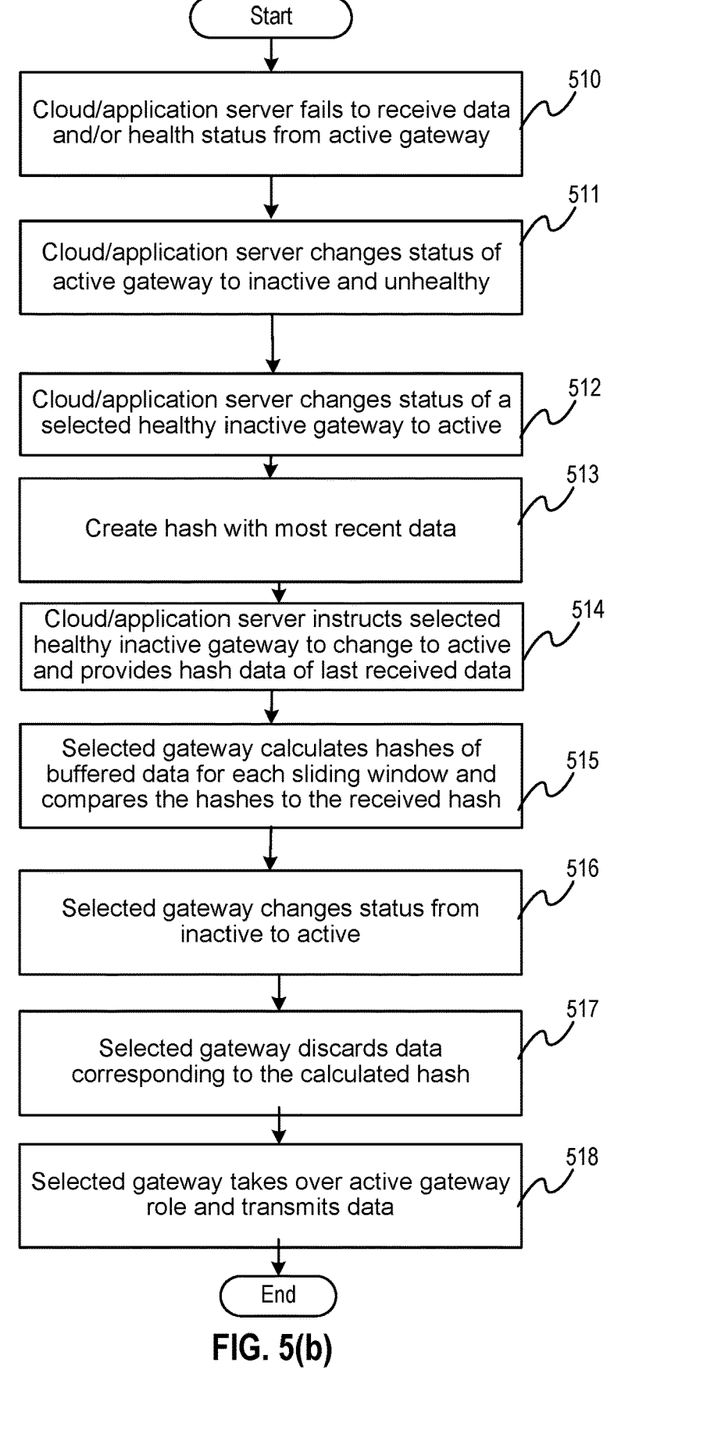
FIG. 5(b) illustrates an example flow for the system after failure, in accordance with an example implementation.

FIG. 5(b) illustrates an example flow for the system after failure, in accordance with an example implementation, as illustrated in FIGS. 2 and 3. At 510, the cloud/application server 120 fails to receive data and/or the health status from active gateway 110. At 511, the cloud/application server 120 changes the active/inactive status of active gateway 110 to inactive and notes that the active gateway 110 unhealthy. At 512, the cloud/application server 120 changes the status of a selected healthy inactive gateway 111 to active. The cloud/application server 120 can select a healthy inactive gateway 111 through any desired implementation, such as, but not limited to, best latency, best bandwidth, and so on in accordance with the desired implementation. At 513, the cloud/application server 120 creates a hash with the most recently received data to provide an identifier for the received data. At 514, cloud/application server 120 instructs the selected healthy inactive gateway 111 to change to active and provides the hash data of last received data. At 515, the selected gateway 111 calculates hashes of buffered data for each sliding window in its memory, and compares the hashes to the received hash to identify the last transmitted data. At 516, the selected gateway 111 changes its status from inactive to active. At 517, the selected gateway 111 discards the data identified from the calculated hashes. Then at 518, the selected gateway 111 takes over the active gateway role and transmits data after the identified data is discarded.

Figure 5C:
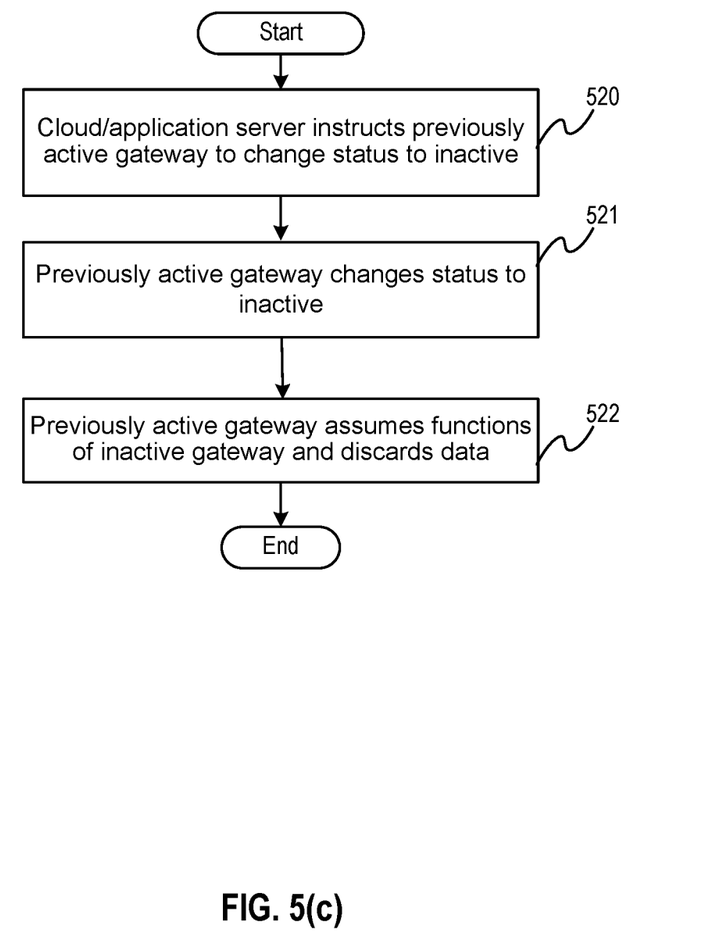
FIG. 5(c) illustrates an example flow for the recovery of the unhealthy gateway, in accordance with an example implementation.

FIG. 5(c) illustrates an example flow for the recovery of the unhealthy gateway, in accordance with an example implementation, as illustrated in FIG. 4. In the example of FIG. 4, assume that the unhealthy previously active gateway 110 is able to recover and reconnect to the cloud/application server 120. At 520, the cloud/application server 120 instructs previously active gateway 110 to change its status to inactive. At 521, the previously active gateway 110 changes its status to inactive. At 522, the previously active gateway assumes functions of inactive gateway and discards data according to the inactive gateway policy.

Figure 6:
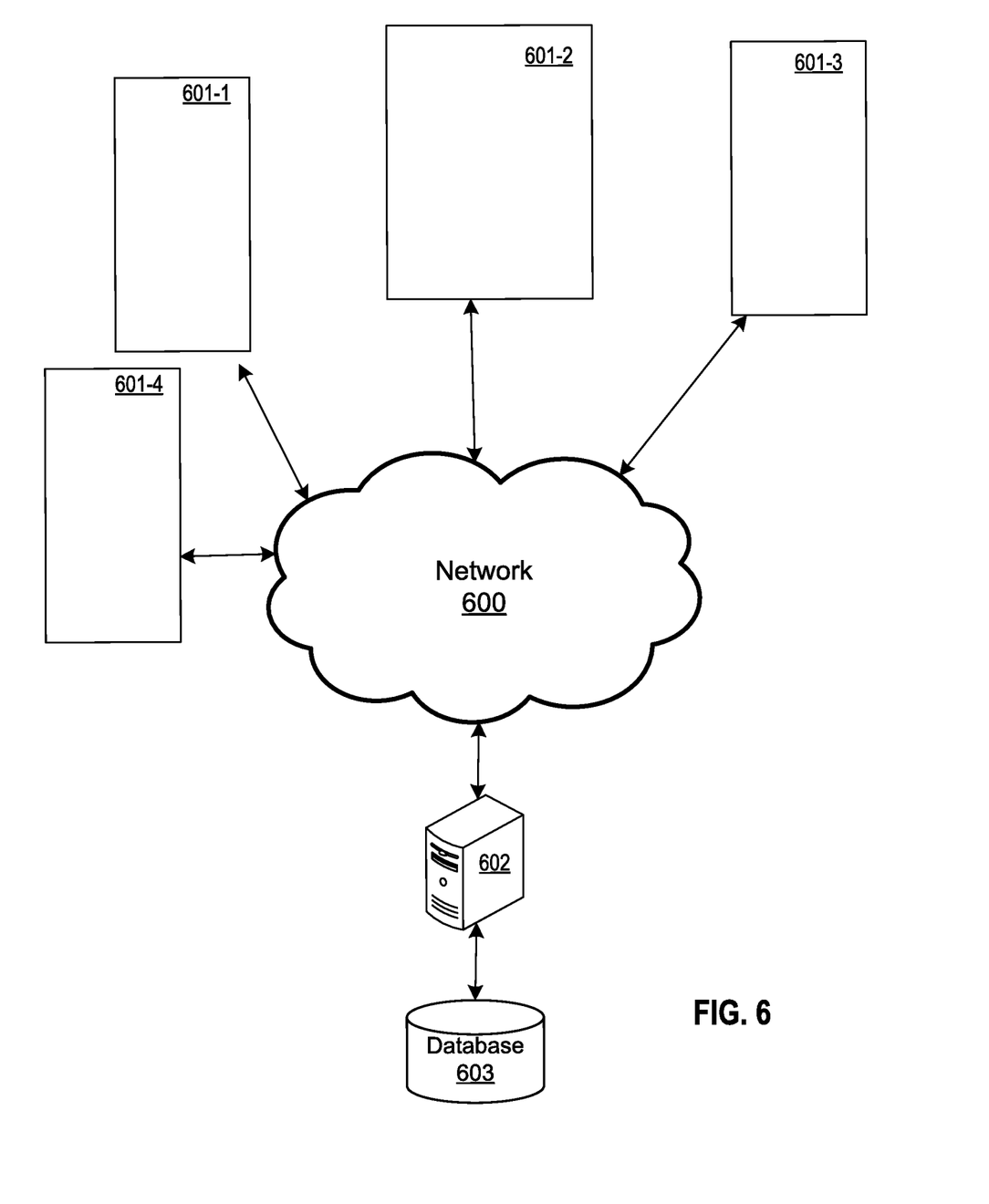
FIG. 6 illustrates a system involving a plurality of systems with connected sensors and a management apparatus, in accordance with an example implementation.

FIG. 6 illustrates a system involving a plurality of systems with connected sensors and a management apparatus, in accordance with an example implementation. One or more gateways 601-1, 601-2, 601-3, and 601-4 receive sensor data from one or more sensors and are communicatively coupled to a network 600 which is connected to a management apparatus 602, which facilitates functionality for a cloud/application server. The management apparatus 602 manages a database 603, which contains historical data collected from the sensors of the systems 601-1, 601-2, 601-3, and 601-4. In alternate example implementations, the data from the sensors of the systems 601-1, 601-2, 601-3, 601-4 and can be stored to a central repository or central database such as proprietary databases that intake data such as enterprise resource planning systems, and the management apparatus 602 can access or retrieve the data from the central repository or central database. Such systems can include robot arms with sensors, turbines with sensors, lathes with sensors, and so on in accordance with the desired implementation. In an example implementation involving mobile platforms in which a set network connection may be difficult to maintain, such as elevators, rail cars, and so on, the gateways 601-1, 601-2, 601-3, and 601-4 can be in the form of cellular devices, with the network 600 being in the form of a cellular network. In the system of FIG. 6, one of the gateways 601-1, 601-2, 601-3, 601-4 is the active gateway transmitting the sensor data, whereas the other gateways are inactive gateways that buffer sensor data and discard the data in accordance with an inactive gateway policy. Each of the gateways 601-1, 601-2, 601-3, 601-4 can provide a health status to the management apparatus 602.

Figure 7:
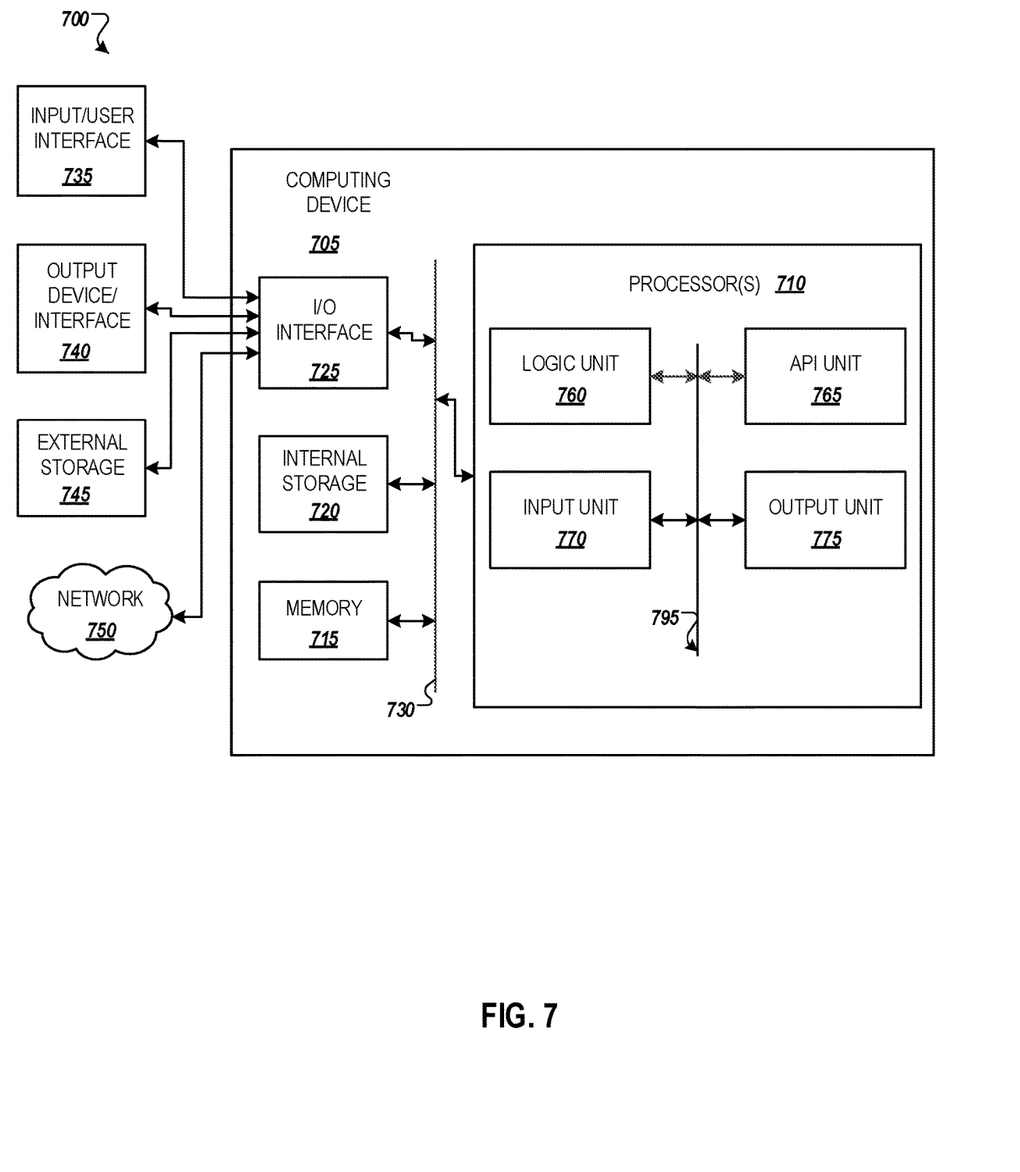
FIG. 7 illustrates an example computing environment with an example computer device suitable for use in some example implementations.

FIG. 7 illustrates an example computing environment with an example computer device suitable for use in some example implementations, such as a management apparatus 602 or a gateway 601-1, 601-2, 601-3, 601-4 as illustrated in FIG. 6.

Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705. I/O interface 725 is also configured to receive images from cameras or provide images to projectors or displays, depending on the desired implementation.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

In an example of a gateway 601-4, 601-2, 601-3, and 601-4, memory 715 is configured to store sensor data received from one or more sensors, along with its active/inactive status and its health status. Processor(s) 710 can be configured to provide a health status to a server over a network as illustrated in FIGS. 1-5(c). When the status is set to active, processor(s) 710 can be configured to transmit the stored received sensor data to the cloud/application server as illustrated in FIG. 1; and when it is set to inactive, processor(s) 710 can be configured to manage the received sensor data in memory until data needs to be discarded according to the inactive gateway policy as illustrated in FIG. 1 and FIG. 5(a). When processor(s) 710 receive a status change from the cloud/application server to change the status to active, processor(s) 710 changes the status to active; discards, from the memory, the received sensor data already transmitted to the server; and transmits the stored received sensor data to the server as illustrated in FIG. 5(b).

In an example of a gateway 601-1, 601-2, 601-3, and 601-4, processor(s) 710 can be configured to, for the occurrence of a failure, change the health status to unhealthy; and transmit the health status to the server. The failure can be determined in accordance with any policy, such as, but not limited to, failure to receive sensor data at designated times, failure to maintain required latency/bandwidth for transmission, and so on in accordance with the desired implementation.

In an example of a gateway 601-1, 601-2, 601-3, and 601-4, processor(s) 710 can be configured to discard, from the memory 715, the received sensor data already transmitted to the server, by receiving a hash value from the server indicative of identified sensor data already transmitted to the server; using a window to search the received sensor data in the memory corresponding to the received hash value; and discarding the window of the received sensor data corresponding to the hash value as illustrated in FIGS. 3, 4, and 5(b).

In an example of a management apparatus 602 such as a cloud/application server 120, processor(s) 710 can be configured to, for a detection of a failure of the active gateway based on the health status, select an inactive gateway from the one or more inactive gateways to take over transmission of the active gateway; change a status of the active gateway to inactive; identify the sensor data received from the active gateway before the failure; and control the selected inactive gateway to discard the identified sensor data and resume transmission of the sensor data as illustrated in FIGS. 2-3 and FIG. 5(b). As illustrated in FIG. 2, the detection of the failure of the active gateway based on the health status can be determined from non-receipt of the health status from the active gateway. In another example implementation, the detection of the failure of the active gateway based on the health status can be determined from the health status from the active gateway indicating a failure (e.g., transmitting a status of unhealthy).

In an example of a management apparatus 602 such as a cloud/application server 120, processor(s) 710 can be configured to identify the sensor data received from the active gateway before the failure by calculating a hash value from a window of consecutive time-series data in the received sensor data; and wherein the controlling the selected inactive gateway to discard the identified sensor data and resume transmission of the sensor data to the server involves transmitting the hash value to the selected inactive gateway, wherein the selected inactive gateway discards the received sensor data matching the window and the hash value as illustrated in FIGS. 2-3 and FIG. 5(b).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
providing a health status from each of a plurality of gateways, the plurality of gateways comprising an active gateway and one or more inactive gateways, the plurality of gateways receiving sensor data, wherein the active gateway transmits the received sensor data to a server;
for a detection of a failure of the active gateway based on the health status:
selecting an inactive gateway from the one or more inactive gateways to take over transmission of the active gateway;
changing a status of the active gateway to inactive;
identifying the sensor data received from the active gateway before the failure; and
controlling the selected inactive gateway to discard the identified sensor data and resume transmission of the sensor data to the server.

2. The method of claim 1, wherein the detection of the failure of the active gateway based on the health status is determined from non-receipt of the health status from the active gateway.

3. The method of claim 1, wherein the detection of the failure of the active gateway based on the health status is determined from the health status from the active gateway indicating a failure.

4. The method of claim 1, wherein the identifying the sensor data received from the active gateway before the failure comprises calculating a hash value from a window of consecutive time-series data in the received sensor data; and wherein the controlling the selected inactive gateway to discard the identified sensor data and resume transmission of the sensor data to the server comprises transmitting the hash value to the selected inactive gateway, wherein the selected inactive gateway discards the received sensor data matching the window and the hash value.

5. The method of claim 1, wherein the plurality of gateways are cellular devices, and wherein the active gateway transmits the received sensor data to the server through a cellular network.

6. A non-transitory computer readable medium, storing instructions for executing a process, the instructions comprising:

providing a health status from each of a plurality of gateways, the plurality of gateways comprising an active gateway and one or more inactive gateways, the plurality of gateways receiving sensor data, wherein the active gateway transmits the received sensor data to a server;

for a detection of a failure of the active gateway based on the health status:
selecting an inactive gateway from the one or more inactive gateways to take over transmission of the active gateway;
changing a status of the active gateway to inactive;
identifying the sensor data received from the active gateway before the failure; and
controlling the selected inactive gateway to discard the identified sensor data and resume transmission of the sensor data to the server.

7. The non-transitory computer readable medium of claim 6, wherein the detection of the failure of the active gateway based on the health status is determined from non-receipt of the health status from the active gateway.

8. The non-transitory computer readable medium of claim 6, wherein the detection of the failure of the active gateway based on the health status is determined from the health status from the active gateway indicating a failure.

9. The non-transitory computer readable medium of claim 6, wherein the identifying the sensor data received from the active gateway before the failure comprises calculating a hash value from a window of consecutive time-series data in the received sensor data; and wherein the controlling the selected inactive gateway to discard the identified sensor data and resume transmission of the sensor data to the server comprises transmitting the hash value to the selected inactive gateway, wherein the selected inactive gateway discards the received sensor data matching the window and the hash value.

10. The non-transitory computer readable medium of claim 6, wherein the plurality of gateways are cellular devices, and wherein the active gateway transmits the received sensor data to the server through a cellular network.

11. An apparatus, comprising:
a memory configured to store received sensor data; and
a processor, configured to:
provide a health status to a server over a network;
for the apparatus having a status of active:
transmit the stored received sensor data to the server; and
for the apparatus having the status of inactive:
manage the received sensor data in memory;
for receipt of a status change to change the status to active:
change the status of the apparatus to active;
discard, from the memory, the received sensor data already transmitted to the server; and
transmit the stored received sensor data to the server.

12. The apparatus of claim 11, the processor configured to:
for a failure occurring in the apparatus:
change the health status to unhealthy; and
transmit the health status to the server.

13. The apparatus of claim 11, wherein the processor is configured to discard, from the memory, the received sensor data already transmitted to the server, by:
receiving a hash value from the server indicative of identified sensor data already transmitted to the server;
using a window to search the received sensor data in the memory corresponding to the received hash value; and
discarding the window of the received sensor data corresponding to the hash value.

14. The apparatus of claim 11, wherein the apparatus is a cellular device, and wherein the network is a cellular network.

* * * * *